(12) United States Patent
Yasuda et al.

(10) Patent No.: US 9,453,748 B2
(45) Date of Patent: Sep. 27, 2016

(54) FLOW METER DEVICE

(71) Applicant: Panasonic Intellectual Property Management Co., Ltd., Osaka-shi, Osaka (JP)

(72) Inventors: Kenji Yasuda, Kyoto (JP); Akihisa Adachi, Kyoto (JP); Yuji Fujii, Nara (JP); Yuji Nakabayashi, Nara (JP); Yukio Sakaguchi, Nara (JP); Hirokazu Gotou, Shiga (JP); Yasuharu Kawano, Nara (JP); Aoi Watanabe, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/434,645

(22) PCT Filed: Oct. 9, 2013

(86) PCT No.: PCT/JP2013/006029
§ 371 (c)(1),
(2) Date: Apr. 9, 2015

(87) PCT Pub. No.: WO2014/057673
PCT Pub. Date: Apr. 17, 2014

(65) Prior Publication Data
US 2015/0253166 A1    Sep. 10, 2015

(30) Foreign Application Priority Data

Oct. 10, 2012 (JP) ................................. 2012-224782

(51) Int. Cl.
*G01F 1/66*    (2006.01)
*G01F 5/00*    (2006.01)

(52) U.S. Cl.
CPC ............ *G01F 1/662* (2013.01); *G01F 1/667* (2013.01); *G01F 5/00* (2013.01)

(58) Field of Classification Search
CPC ............. G01F 1/20; G01F 1/32; G01F 1/66; G01F 1/37; G01F 1/02

USPC .............. 73/861.18, 861.24, 861.29, 861.28, 73/861.31, 861.55
See application file for complete search history.

(56) References Cited

U.S. PATENT DOCUMENTS 3,838,598 A * 10/1974 Tompkins ................. G01F 1/42
                                                    73/861.52
4,365,518 A * 12/1982 Zacharias, Jr. ........... G01F 1/66
                                                    73/861.28

(Continued)

FOREIGN PATENT DOCUMENTS

EP    1 296 118 A1     3/2003
EP    2 053 366 A1 *   4/2009 ............... G01F 1/66

(Continued)

OTHER PUBLICATIONS

Extended European Search Report in European Application No. 13844719.8, dated Sep. 29, 2015, 7 pages.

(Continued)

*Primary Examiner* — Jewel V Thompson
(74) *Attorney, Agent, or Firm* — Brinks Gilson & Lione (57) ABSTRACT

A flow meter device includes: an inlet portion, into which a fluid flows; an outlet portion, from which the fluid flows out; a plurality of measurement passage portions provided parallel to each other between the inlet portion and the outlet portion; and at least one flow rate measurement unit, each flow rate measurement unit being configured to measure a flow rate of the fluid that flows through a passage in a corresponding one of the measurement passage portions. Shapes of passages in the respective measurement passage portions coincide with each other. The plurality of measurement passage portions include: the one measurement passage portion(s), which is/are each provided with the flow rate measurement unit; and the other measurement passage portion(s), which is/are not provided with the flow rate measurement unit.

5 Claims, 10 Drawing Sheets

(56) References Cited

U.S. PATENT DOCUMENTS

| | | | | |
|---|---|---|---|---|
| 4,475,406 A * | 10/1984 | Ansaldi | G01F 15/00 73/114.32 |
| 7,454,984 B1 * | 11/2008 | Ross | G01F 1/48 73/861.52 |
| 8,544,342 B1 * | 10/2013 | Feller | G01F 1/3218 73/861.24 |
| 8,596,144 B2 * | 12/2013 | Rieder | G01F 1/8418 73/861.55 |
| 8,806,955 B2 * | 8/2014 | Wible | 73/861.04 |
| 9,003,895 B2 * | 4/2015 | Laird | G01F 1/662 73/861.28 |
| 2010/0163119 A1 * | 7/2010 | Isobe | G01F 1/6842 137/486 |
| 2014/0238148 A1 * | 8/2014 | Priyadarshana | G01F 1/662 73/861.28 |
| 2015/0198472 A1 * | 7/2015 | Furlong | F15D 1/02 73/861.18 |

FOREIGN PATENT DOCUMENTS

| | | |
|---|---|---|
| JP | 59-170722 A | 9/1984 |
| JP | 63-29209 Y2 | 1/1985 |
| JP | 9-5133 A | 1/1997 |
| JP | 2000-146662 A | 5/2000 |
| WO | WO 2005/005932 A1 | 1/2005 |

OTHER PUBLICATIONS

International Search Report, and English language translation thereof, in corresponding International Application No. PCT/JP2013/006029, dated Nov. 5, 2013, 3 pages.

* cited by examiner

FLOW METER DEVICE

This application is a 371 application of PCT/JP2013/006029 having an international filing date of Oct. 9, 2013, which claims priority to JP 2012-224782 filed Oct. 10, 2012, the entire contents of which are incorporated herein by reference.

TECHNICAL FIELD

The present invention relates to flow meter devices for measuring the flow rate of a fluid flowing through piping based on the flow rate of the fluid passing through a plurality of measurement passages.

BACKGROUND ART

Figure 10:
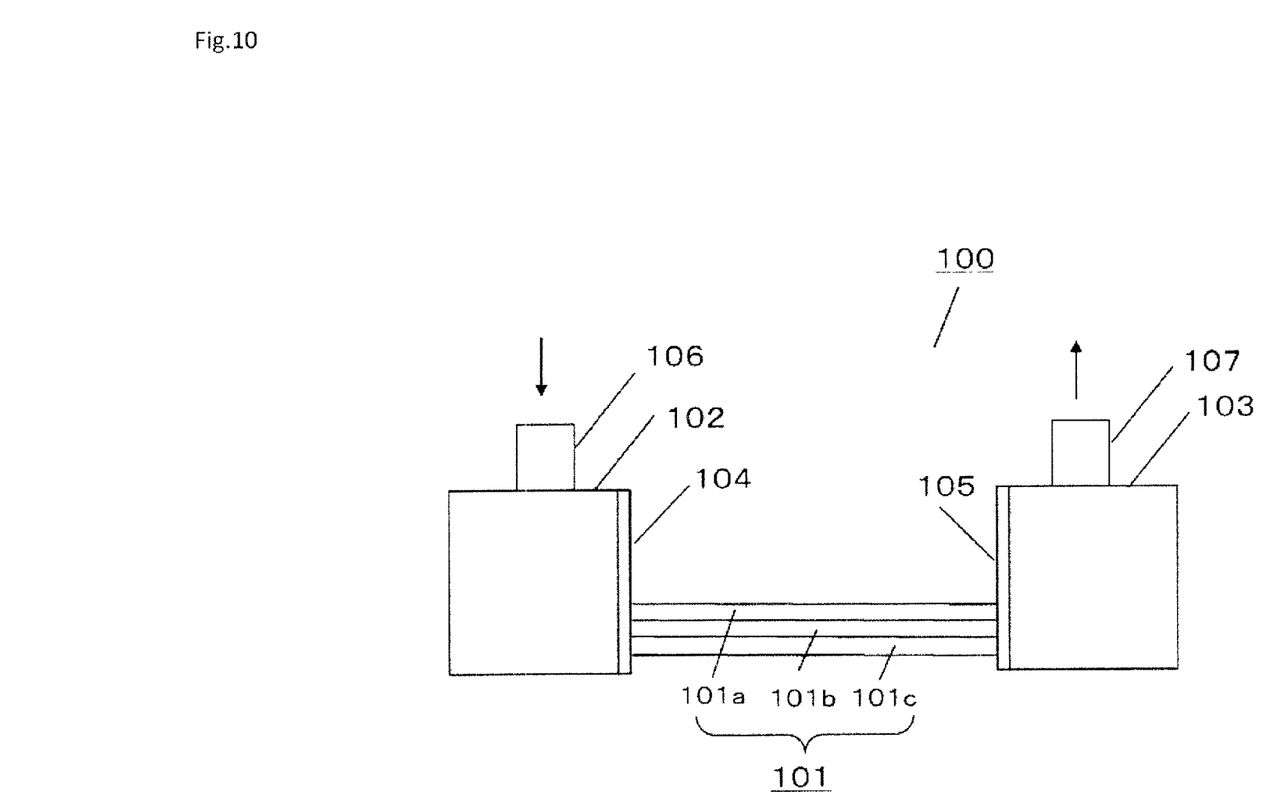
FIG. 10 shows a conventional ultrasonic flow meter device.

Conventionally, there are flow meter devices for measuring the flow rate of a fluid in piping by using a plurality of measurement passages connecting to the piping. One such known flow meter device is an ultrasonic flow meter device disclosed in Patent Literature 1. FIG. 10 shows such an ultrasonic flow meter device 100, which is configured as follows: a plurality of flow rate measurement units 101 are provided between an upstream chamber 102 and a downstream chamber 103; and an ultrasonic vibrator is disposed on each of the flow rate measurement units 101.

CITATION LIST

Patent Literature

PTL 1: Japanese Laid-Open Patent Application Publication No. H09-5133

SUMMARY OF INVENTION

Technical Problem

In the ultrasonic flow meter device disclosed in Patent Literature 1, an ultrasonic vibrator is installed on each flow rate measurement unit 101. Accordingly, the flow rate of a fluid passing through each flow rate measurement unit 101 is measured. Based on each measured flow rate, the flow rate of the fluid flowing through piping is measured. This makes it possible to realize high measuring precision. However, this technique incurs the product cost and installation cost of the ultrasonic vibrators, and thus has a problem of high cost.

The present invention has been made to solve the above-described problem. An object of the present invention is to provide a flow meter device that realizes cost reduction while maintaining high measuring precision.

Solution to Problem

A flow meter device according to one aspect of the present invention includes: an inlet portion, into which a fluid flows; an outlet portion, from which the fluid flows out; a plurality of measurement passage portions provided parallel to each other between the inlet portion and the outlet portion; and at least one flow rate measurement unit, each flow rate measurement unit being configured to measure a flow rate of the fluid that flows through a passage in a corresponding one of the measurement passage portions. Shapes of passages in the respective measurement passage portions coincide with each other. The plurality of measurement passage portions include: the one measurement passage portion(s), which is/are each provided with the flow rate measurement unit; and the other measurement passage portion(s), which is/are not provided with the flow rate measurement unit.

Advantageous Effects of Invention

The present invention is configured as described above, and has an advantage of being able to provide a flow meter device that realizes cost reduction while maintaining high measuring precision.

The above object, other objects, features, and advantages of the present invention will be made clear by the following detailed description of preferred embodiments with reference to the accompanying drawings.

DETAILED DESCRIPTION OF THE PREFERRED EMBODIMENTS

A flow meter device according to a first aspect of the present invention includes: an inlet portion, into which a fluid flows; an outlet portion, from which the fluid flows out; a plurality of measurement passage portions provided parallel to each other between the inlet portion and the outlet portion; and at least one flow rate measurement unit, each flow rate measurement unit being configured to measure a flow rate of the fluid that flows through a passage in a corresponding one of the measurement passage portions. Shapes of passages in the respective measurement passage portions coincide with each other. The plurality of measurement passage portions include: the one measurement passage portion(s), which is/are each provided with the flow rate measurement unit; and the other measurement passage portion(s), which is/are not provided with the flow rate measurement unit.

A flow meter device according to a second aspect of the present invention may be configured such that, in the above first aspect, a dimension of a cross section of the passage of each measurement passage portion, the cross section being obtained by cutting the passage perpendicularly to a longitudinal direction of the measurement passage portion, is set such that when a flow of the fluid is at a maximum flow velocity, the flow becomes a streamline flow.

A flow meter device according to a third aspect of the present invention may be configured such that, in the above first or second aspect, the plurality of measurement passage portions are at least three measurement passage portions; at least two of the plurality of measurement passage portions are each provided with the flow rate measurement unit; and at least one of the plurality of measurement passage portions is not provided with the flow rate measurement unit.

A flow meter device according to a fourth aspect of the present invention may be configured such that the flow meter device according to any one of the above first to third aspects further includes partition plates, each partition plate dividing the passage of a corresponding one of the measurement passage portions in parallel to a longitudinal direction of the corresponding measurement passage portion.

A flow meter device according to a fifth aspect of the present invention may be configured such that the flow meter device according to any one of the above first to fourth aspects further includes a straightening member provided in at least one of an interior space of the inlet portion and an interior space of the outlet portion.

Hereinafter, a specific description of embodiments of the present invention is given with reference to the drawings. In the drawings, the same or corresponding elements are denoted by the same reference signs, and repeating the same descriptions is avoided below.

Embodiment 1

(Configuration of Flow Meter Device)

Figure 1:
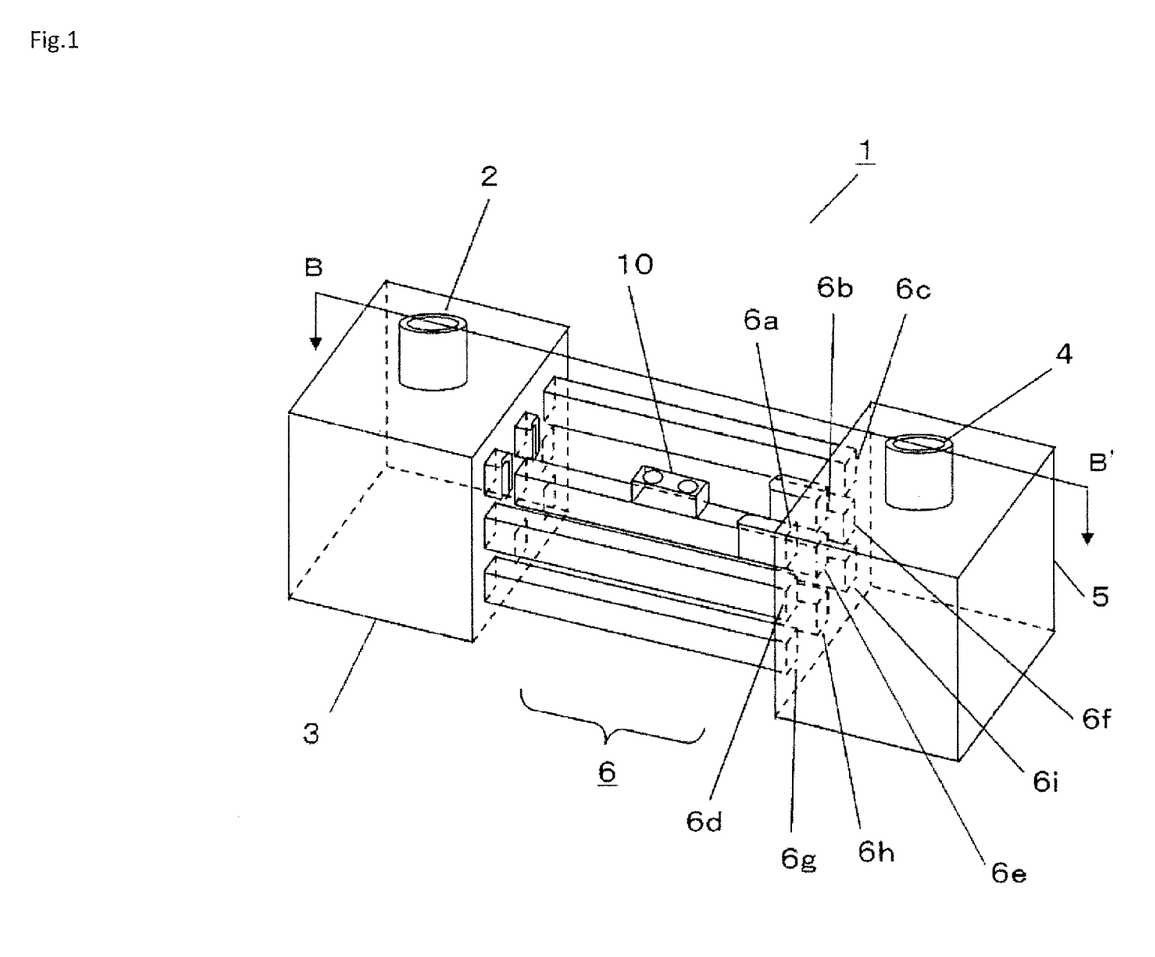
FIG. 1 is a perspective view showing a flow meter device according to Embodiment 1 of the present invention.

FIG. 1 is a perspective view showing a flow meter device 1 according to Embodiment 1. It should be noted that, in FIG. 1, only part of measurement passage portions 6a and 6b is represented by solid lines, and only part of measurement passage portions 6f, 6h, and 6i is represented by dashed lines so that an ultrasonic sensor unit 10 can be readily seen.

As shown in FIG. 1, the flow meter device 1 is, for example, installed on piping (not shown) through which a fluid such as a gas flows, and is a meter device configured to measure the flow rate of the fluid flowing through the piping. The flow meter device 1 includes an inlet portion 3, an outlet portion 5, and a plurality of measurement passage portions 6 provided between the inlet portion 3 and the outlet portion 5.

Each of the inlet portion 3 and the outlet portion 5 is a chamber with an interior space formed therein. An inlet pipe 2 is connected to the inlet portion 3. The fluid flows from the inlet pipe 2 into the inlet portion 3. An outlet pipe 4 is connected to the outlet portion 5. The fluid flows out of the outlet portion 5 into the outlet pipe 4.

Each measurement passage portion 6 is a tubular member with an interior space formed therein. The interior space extends through the measurement passage portion 6 in its axial direction, and is used as a passage (i.e., a measurement passage). Each measurement passage portion 6 is connected to the inlet portion 3 and the outlet portion 5. The measurement passage of each measurement passage portion 6 is in communication with the interior space of the inlet portion 3 and the interior space of the outlet portion 5.

In the present embodiment, the plurality of measurement passage portions 6 are nine measurement passage portions 6a, 6b, 6c, 6d, 6e, 6f, 6g, 6h, and 6i. These measurement passage portions 6a to 6i are provided parallel to each other. The measurement passage portions 6a, 6b, and 6c are arranged at regular intervals at upper positions. The measurement passage portions 6d, 6e, and 6f are arranged at regular intervals at middle positions. The measurement passage portions 6g, 6h, and 6i are arranged at regular intervals at lower positions.

The measurement passage portions 6a, 6d, and 6g are arranged at regular intervals in a front row. The measurement passage portions 6b, 6e, and 6h are arranged at regular intervals in a middle row. The measurement passage portions 6c, 6f, and 6i are arranged at regular intervals in a back row. In this arrangement, the measurement passage portion 6e is positioned at the center among the measurement passage portions 6. It should be noted that the number of measurement passage portions 6 and the arrangement thereof are not limited to the above, so long as the measurement passage portions 6 are arranged in a symmetrical manner.

For example, the plurality of measurement passage portions 6 may be in symmetrical arrangement in the front-back direction, or in symmetrical arrangement in the vertical direction, or in symmetrical arrangement in the front-back direction as well as in the vertical direction.

The ultrasonic sensor unit 10 is a sensor for detecting the flow rate of the fluid passing through a measurement passage portion 6. The ultrasonic sensor unit 10 is provided on the measurement passage portion 6e. However, the measurement passage portion 6 that is provided with the ultrasonic sensor unit 10 is not limited to the measurement passage portion 6e. The installation position of the ultrasonic sensor unit 10 is set so that, for example, the ultrasonic sensor unit 10 can measure the average value of the flow rates of the fluid in the nine measurement passage portions 6. It should be noted that the number of ultrasonic sensor units 10 and the installation position(s) thereof are set in consideration of, for example, design conditions such as the shape of the inlet portion 3 and the arrangement of the measurement passage portions 6.

(Configuration of Measurement Passage Portions)

Figure 2:
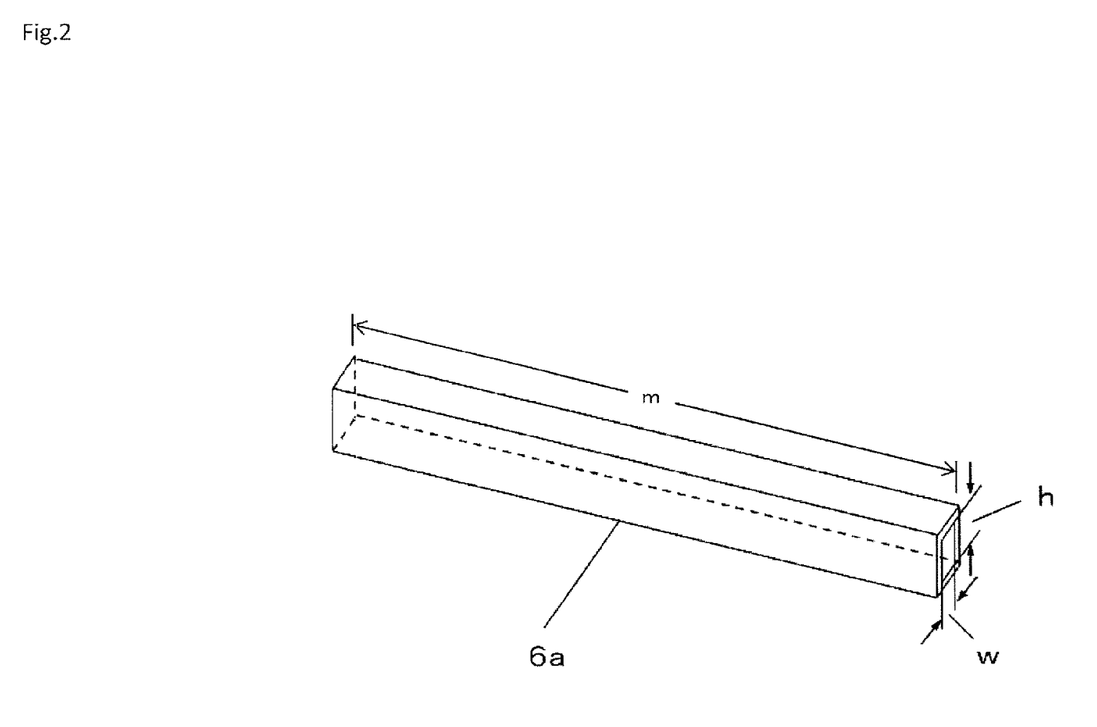
FIG. 2 is a perspective view showing a measurement passage portion of FIG. 1.

FIG. 2 is a perspective view showing the measurement passage portion 6a. Although the description below only describes the configuration of the measurement passage portion 6a, the other measurement passage portions 6b, 6c, 6d, 6e, 6f, 6g, 6h, and 6i are configured in the same manner as the measurement passage portion 6a.

As shown in FIG. 2, the measurement passage portion 6a is a tubular component. A cross section obtained by cutting the measurement passage portion 6a perpendicularly to the longitudinal direction of the measurement passage portion 6a has a rectangular shape. The measurement passage, i.e., the interior space of the measurement passage portion 6a, has a cross section whose width dimension w is less than its height dimension h. The cross-sectional shape of the measurement passage does not vary, i.e., uniform, in the axial direction of the measurement passage portion 6a. It should be noted that the cross-sectional shape of the measurement passage is not limited to a rectangular shape, but may be a round shape, for example. However, the nine measurement passage portions 6 are formed such that the shapes of their measurement passages coincide with each other. Accordingly, dimensions (all of the width w, the height h, and the length m) that determine the shape of each measurement passage are the same among the nine measurement passage portions 6.

The cross-sectional dimensions of the measurement passage are set such that the flow of the fluid in the measurement passage becomes a streamline flow. For example, the cross-sectional dimensions are set based on the viscosity and density of the fluid and the velocity of the fluid flowing through the measurement passage, such that the Reynolds number becomes less than 2300. In a case where the aspect ratio of the cross section of the measurement passage (i.e., height dimension h/width dimension w) is small, an equivalent diameter is used as a characteristic length, and the cross-sectional dimensions are set such that the Reynolds number becomes less than 2300. In a case where the aspect ratio of the cross section of the measurement passage is large, the width dimension w is used as a characteristic length, and the cross-sectional dimensions are set such that the Reynolds number becomes less than 2300.

It is preferable that the flow of the fluid in the measurement passage be a streamline flow in any actual use. Therefore, at the time of setting the above cross-sectional dimensions, it is assumed that the flow velocity of the fluid in the measurement passage is at its maximum, and the cross-sectional dimensions are set so that the flow of the fluid will be a streamline flow even if the flow velocity of the fluid in the measurement passage is the maximum flow velocity. The maximum flow velocity is the velocity of the fluid when the fluid flows at a predetermined maximum flow rate of the flow meter device 1, and is the highest velocity among the fluid velocities in the respective measurement passages.

(Configuration of Measurement Passage Portion with Flow Rate Measurement Unit Installed Thereon)

Figure 3:
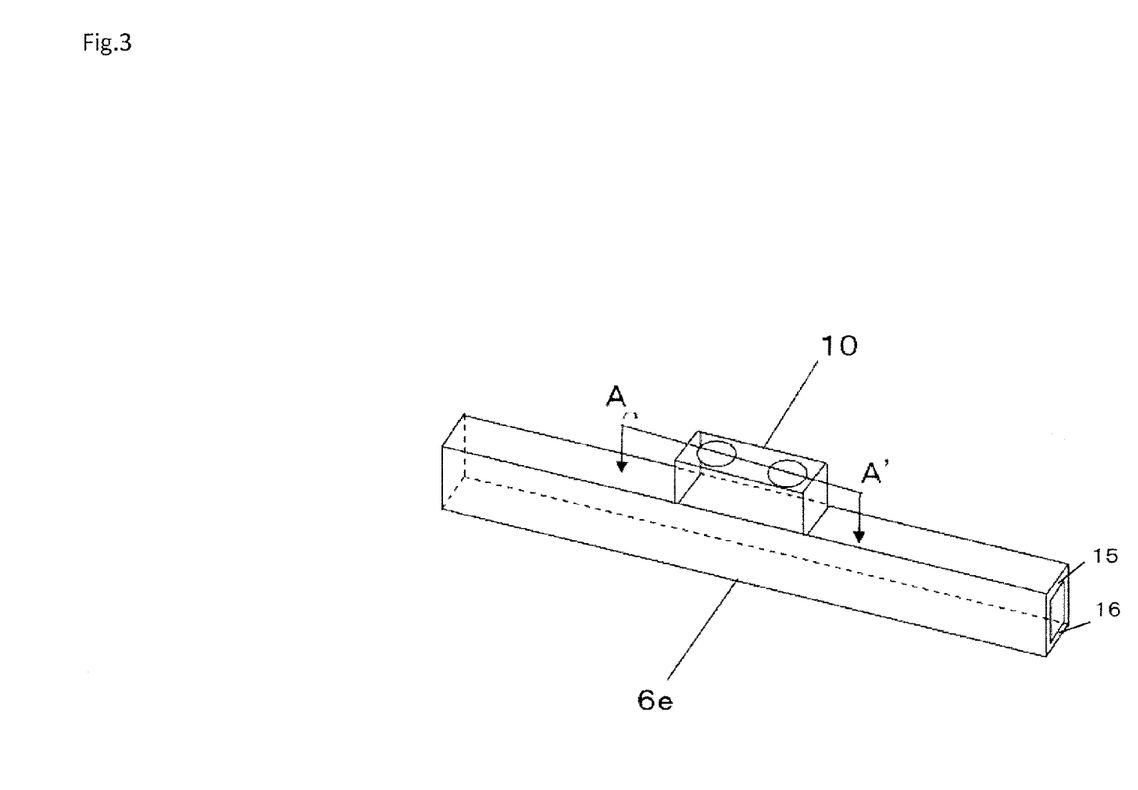
FIG. 3 is a perspective view showing the measurement passage portion of FIG. 1.
Figure 4:
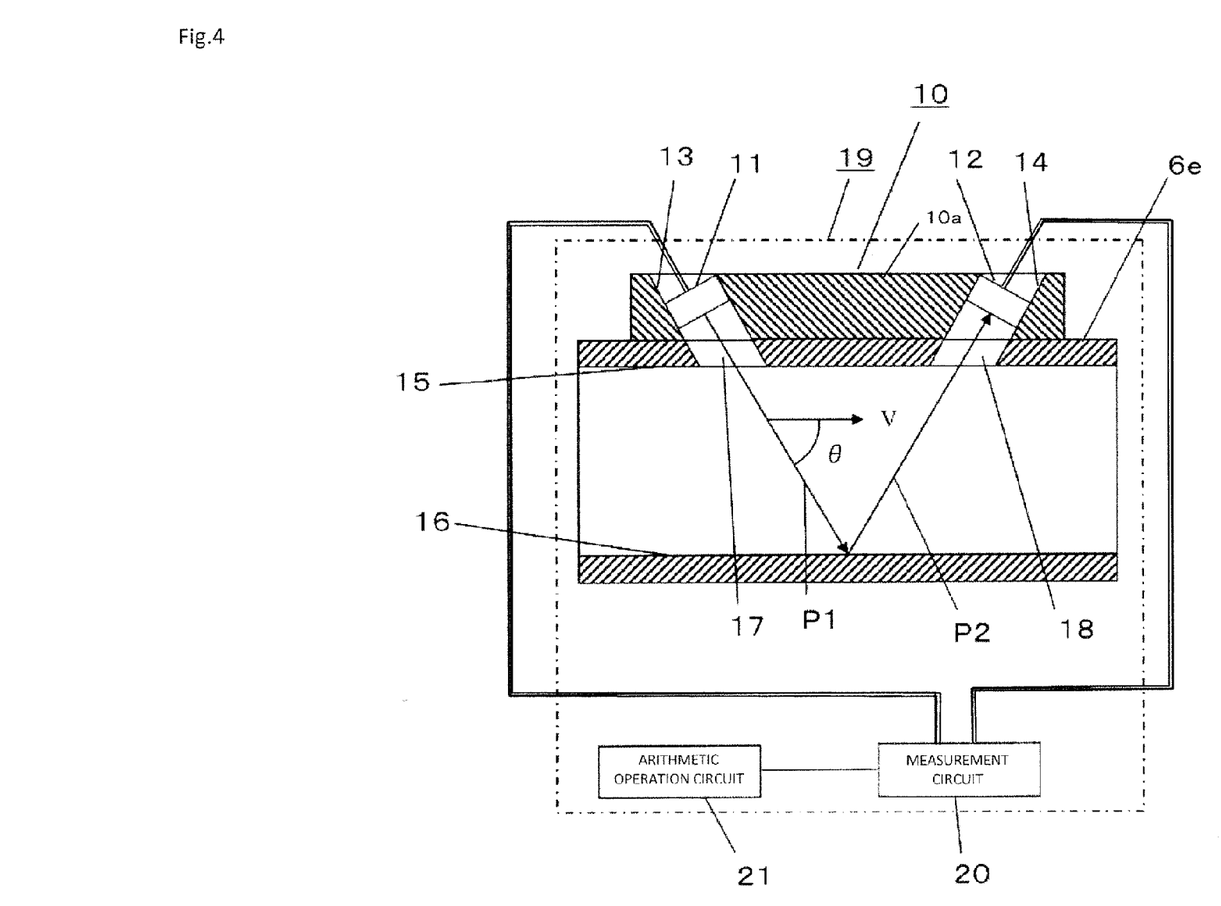
FIG. 4 is a sectional view showing part of the measurement passage portion, which is cut along line A-A' of FIG. 3.

FIG. 3 is a perspective view showing the measurement passage portion 6e with the ultrasonic sensor unit 10 installed thereon. FIG. 4 is a sectional view showing part of the measurement passage portion 6e, which is cut along line A-A' of FIG. 3.

As shown in FIG. 3, the measurement passage portion 6e includes an upper surface 15, a lower surface 16, and two side surfaces. These surfaces are arranged symmetrically with respect to an axis extending in the longitudinal direction of the measurement passage portion 6e. The ultrasonic sensor unit 10 is installed above the upper surface 15 of the axially central part of the measurement passage portion 6e. The installation position of the ultrasonic sensor unit 10 is not limited to this position. For example, if the flow velocity of the fluid is non-uniform in a part of the measurement passage portion 6e, the part being upstream of the axially central part of the measurement passage portion 6e, the ultrasonic sensor unit 10 is installed on a part of the measurement passage portion 6e, the part being downstream of the axially central part of the measurement passage portion 6e. If there is a possibility that pulsation in the flow in the measurement passage portion 6e occurs in the axial direction, the ultrasonic sensor unit 10 is installed on the central part of the measurement passage portion 6e in the axial direction of the measurement passage.

As shown in FIG. 4, a first ultrasonic transmission window 17 and a second ultrasonic transmission window 18 are open in the upper surface 15 of the measurement passage portion 6e. These ultrasonic transmission windows 17 and 18 are arranged side by side in the axial direction of the measurement passage portion 6e, and extend through the upper surface 15. The lower surface 16 is configured such that the lower surface 16 serves as a reflecting surface for an ultrasonic wave.

A flow rate measurement unit 19 measures the flow rate of the fluid flowing through the passage in the measurement passage portion 6. The flow rate measurement unit 19 includes the ultrasonic sensor unit 10, a measurement circuit 20, an arithmetic operation circuit 21, and a driver (not shown). The ultrasonic sensor unit 10 includes a body 10a, a first ultrasonic transducer 11, and a second ultrasonic transducer 12. The ultrasonic transducers 11 and 12 are connected to the measurement circuit 20 by lead wires. The driver is provided, for example, in the measurement circuit 20 or the body 10a.

Two openings are formed in the body 10a of the ultrasonic sensor unit 10. The portion around one of the openings is used as a first retainer 13, and the portion around the other opening is used as a second retainer 14. The first ultrasonic transducer 11 is fitted in the opening in the first retainer 13, such that the first ultrasonic transducer 11 is fixed to the first retainer 13. The second ultrasonic transducer 12 is fitted in the opening in the second retainer 14, such that the second ultrasonic transducer 12 is fixed to the second retainer 14.

The ultrasonic sensor unit 10 is installed above the upper surface 15 of the measurement passage portion 6e, such that the ultrasonic transmission windows 17 and 18 correspond to the openings in the retainers 13 and 14, respectively. Accordingly, the opening in the first retainer 13 is in communication with the first ultrasonic transmission window 17, and the opening in the second retainer 14 is in communication with the second ultrasonic transmission window 18.

The measurement circuit 20 is a propagation time measurement unit configured to measure a time that an ultrasonic wave takes to propagate between the pair of ultrasonic transducers 11 and 12. The arithmetic operation circuit 21 is connected to the measurement circuit 20, and is a flow rate calculation unit configured to calculate the flow rate of the fluid based on the time measured by the measurement circuit 20. It should be noted that the measurement circuit 20 and the arithmetic operation circuit 21 may be realized by a single circuit.

It should be noted that the flow meter device 1 adopts a "V-path" configuration, in which the lower surface 16 serving as a reflecting surface is provided between the pair of ultrasonic transducers 11 and 12. This configuration is merely a non-limiting example. As an alternative, for example, the flow meter device 1 may adopt a "Z-path" configuration, in which the pair of ultrasonic transducers 11 and 12 is disposed such that the ultrasonic transducers 11 and 12 face each other with the axis of the measurement passage portion 6e in between them. As another alternative, the flow meter device 1 may adopt an "I-path" configuration, in which the pair of ultrasonic transducers 11 and 12 is disposed such that the ultrasonic transducers 11 and 12 face each other in a direction parallel to the axis of the measurement passage portion 6e. As yet another alternative, the flow meter device 1 may adopt a "W-path" configuration, in which three reflecting surfaces are provided between the pair of ultrasonic transducers 11 and 12.

(Method of Operating Flow Meter Device)

Figure 5:
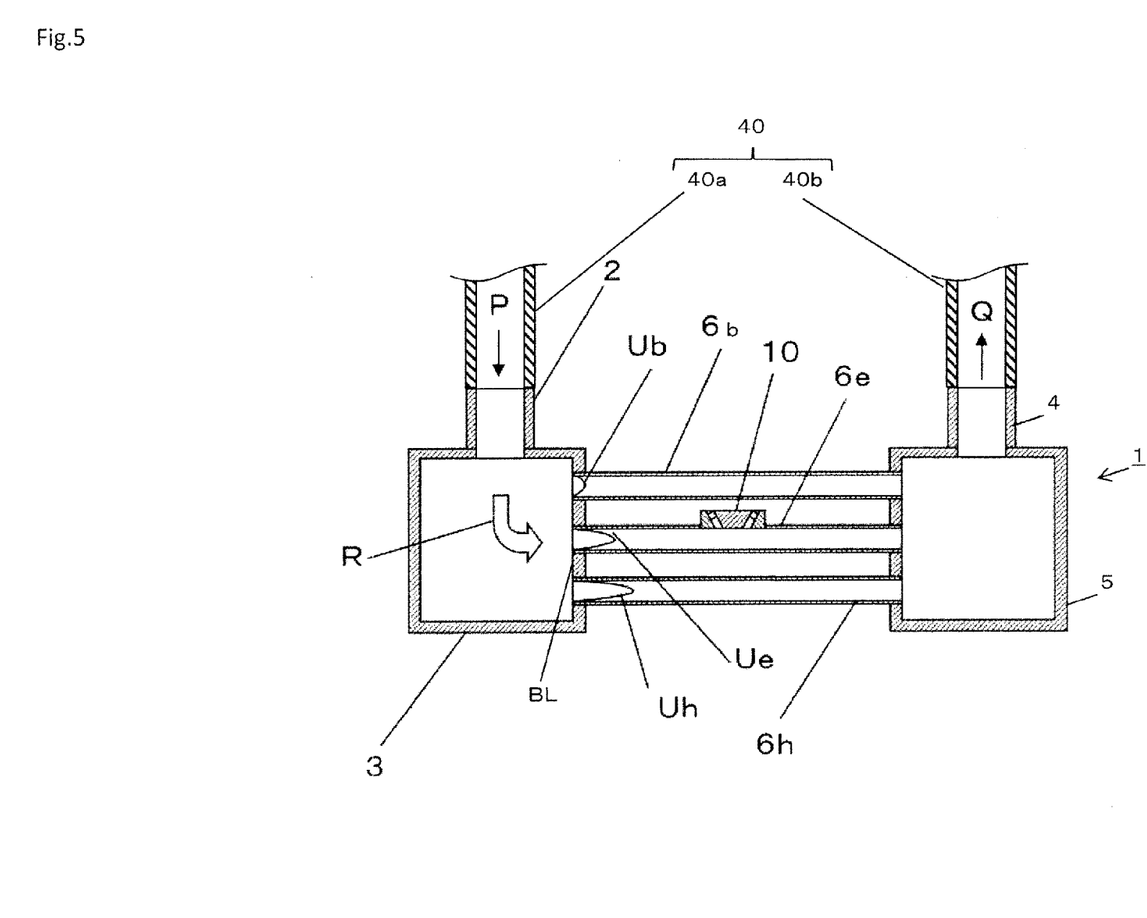
FIG. 5 is a sectional view showing part of the flow meter device, which is cut along line B-B' of FIG. 1.

FIG. 5 is a sectional view showing part of the flow meter device 1, which is cut along line B-B' of FIG. 1. As shown in FIG. 5, in the case of measuring the flow rate in piping 40, first, upstream end piping 40a of the piping 40 is connected to the inlet pipe 2, and downstream end piping 40b of the piping 40 is connected to the outlet pipe 4. As a result, the fluid flows from the upstream end piping 40a of the piping 40 into the inlet portion 3 through the inlet pipe 2. The fluid spreads in the interior space of the inlet portion 3, and thereby the downward flow of the fluid is weakened. Then, the fluid flows into and passes through the measurement passages of the respective measurement passage portions 6. At the time, the ultrasonic sensor unit 10 installed on the measurement passage portion 6e detects the flow velocity of the fluid passing through the measurement passage of the measurement passage portion 6e.

As indicated by an arrow V of FIG. 4, the fluid flows through the measurement passage of the measurement passage portion 6e at a flow velocity V. In a state where the fluid is flowing through the measurement passage, when an emission signal is outputted from the driver to the ultrasonic sensor unit 10, the first ultrasonic transducer 11 emits an ultrasonic wave. The driver outputs the emission signal also to the measurement circuit 20.

As indicated by an arrow P1, the ultrasonic wave passes through the opening in the first retainer 13 and the first ultrasonic transmission window 17 toward the lower surface 16. At the time, the ultrasonic wave propagates through the measurement passage at the speed of sound C. The propagation direction is inclined by an angle θ relative to the flow direction of the fluid. Then, the ultrasonic wave reflects on the lower surface 16, and changes its propagation direction as indicated by an arrow P2. The ultrasonic wave passes through the second ultrasonic transmission window 18 and the opening in the second retainer 14 sequentially, and is incident on the second ultrasonic transducer 12. In this manner, the second ultrasonic transducer 12 receives the ultrasonic wave. The incident signal is outputted to the measurement circuit 20.

In the above-described manner, the ultrasonic wave propagates through the propagation path having an effective length L between the first ultrasonic transducer 11 and the second ultrasonic transducer 12. A propagation time t1 for the ultrasonic wave to propagate through the propagation path is represented by an equation (1) below.

$$t1 = L/(C + V \cos \theta) \quad (1)$$

Next, in a manner similar to the above, an ultrasonic wave is emitted from the second ultrasonic transducer 12 and is incident on the first ultrasonic transducer 11. In this case, a propagation time t2 for the ultrasonic wave to propagate through the propagation path having the effective length L is represented by an equation (2) below.

$$t2 = L/(C - V \cos \theta) \quad (2)$$

Based on the above equations (1) and (2), the flow velocity V of the fluid is represented by an equation (3) below. The length L of the propagation path and the inclination angle θ of the ultrasonic wave in the equation (3) are known values. The propagation times t1 and t2 are each measured by the measurement circuit 20 based on the emission signal and the incident signal. Upon receiving the propagation times t1 and t2 from the measurement circuit 20, the arithmetic operation circuit 21 calculates the flow velocity V of the fluid based on the equation (3) below.

$$V = L/(2 \cos \theta ((1/t1) - (1/t2))) \quad (3)$$

A flow rate qe of the fluid passing through the measurement passage per unit time, the measurement passage having a cross-sectional area S, is represented by an equation (4) below. The cross-sectional area S of the measurement passage is calculated in advance by the product of the width dimension w and the height dimension h of the cross section. Accordingly, the arithmetic operation circuit 21 can calculate the flow rate qe of the fluid based on the calculated flow velocity V by using the equation (4) below.

$$qe = V \times S \quad (4)$$

It should be noted that there is a case where the measured flow velocity V does not coincide with the average value of the flow velocities of the fluid in the nine measurement passage portions 6. In this case, the flow rate qe can be calculated in such a manner that the flow velocity V in the equation (4) is multiplied by a correction coefficient.

As shown in FIG. 5, the fluid herein flows through the inlet portion 3 in accordance with an arrow R, and flows into each of the nine measurement passage portions 6. At the time, a flow velocity Ub in the measurement passage portion 6b, a flow velocity Ue in the measurement passage portion 6e, and a flow velocity Uh in the measurement passage portion 6h are different from each other as indicated by flow velocity distribution curves shown in FIG. 5.

Specifically, a base line BL for the flow velocity distribution curves of the flow velocities Ub, Ue, and Uh shown in FIG. 5 is a line passing through the upstream end of each of the measurement passage portions 6b, 6e, and 6h. Lengths extending perpendicularly to the base line BL from respective positions on the base line BL represent flow velocities at the respective positions on the base line BL. Accordingly, the flow velocities Ub, Ue, and Uh are such that each flow velocity is highest at the center of the respective measurement passage portion 6, and such that the closer to the upper surface or the lower surface of the measurement passage portion 6, the lower the flow velocity.

Among the maximum velocities of the respective flow velocities Ub, Ue, and Uh, the maximum velocity of the flow velocity Ub is the lowest, and the maximum velocity of the flow velocity Uh is the highest while the maximum velocity of the flow velocity Ue is the median value of the maximum velocities of the flow velocities Ub and Uh. The flow of the fluid in each measurement passage portion 6 is a streamline flow. In the case of a streamline flow, it can be considered that its average flow velocity is approximately the half of its maximum flow velocity. Accordingly, the average velocity of the flow velocity Ue in the measurement passage portion 6e can be considered as the average value of the flow velocities in the nine measurement passage portions 6, or as a value close thereto.

A flow rate Qt of the fluid passing through the piping 40 per unit time can be set by using an equation (5) shown below. It should be noted that, in the equation (5) below, the flow rate qe may be multiplied by a correction coefficient as necessary.

$$Qt = 9 \times qe \quad (5)$$

According to the above-described embodiment, the flow meter device 1 is provided with the plurality of measurement passage portions 6. This makes it possible to reduce the cross-sectional dimensions of each measurement passage while keeping a change between the flow velocity of the fluid in the piping 40 and the flow velocity of the fluid in the measurement passage to a minimum. Consequently, the flow of the fluid in the measurement passage can be made a streamline flow, and thereby the measuring precision of the flow meter device 1 is improved. The higher the flow velocity of the fluid in the piping 40, the more turbulent the flow of the fluid in the measurement passage tends to be. In this respect, the cross-sectional dimensions of the measurement passage are set such that the flow of the fluid flowing through the measurement passage at the maximum flow velocity becomes a streamline flow. This makes it possible to stably maintain high measuring precision of the flow meter device 1, thereby improving the reliability of the flow meter device 1.

Since the dimensions and the shape of the measurement passage are the same among all of the measurement passage portions 6, the fluid can be caused to flow into each measurement passage portion 6 substantially uniformly. In addition, the ultrasonic sensor unit 10 is installed on the measurement passage portion 6e so that the ultrasonic sensor unit 10 will measure the average value of the flow velocities in the measurement passage portions 6, or a value close thereto. This realizes further improvement in the measuring precision of the flow meter device 1.

Since not all of the measurement passage portions 6 are provided with the ultrasonic sensor unit 10, the product cost and installation cost of the ultrasonic sensor unit 10 can be reduced.

Embodiment 2

Figure 6:
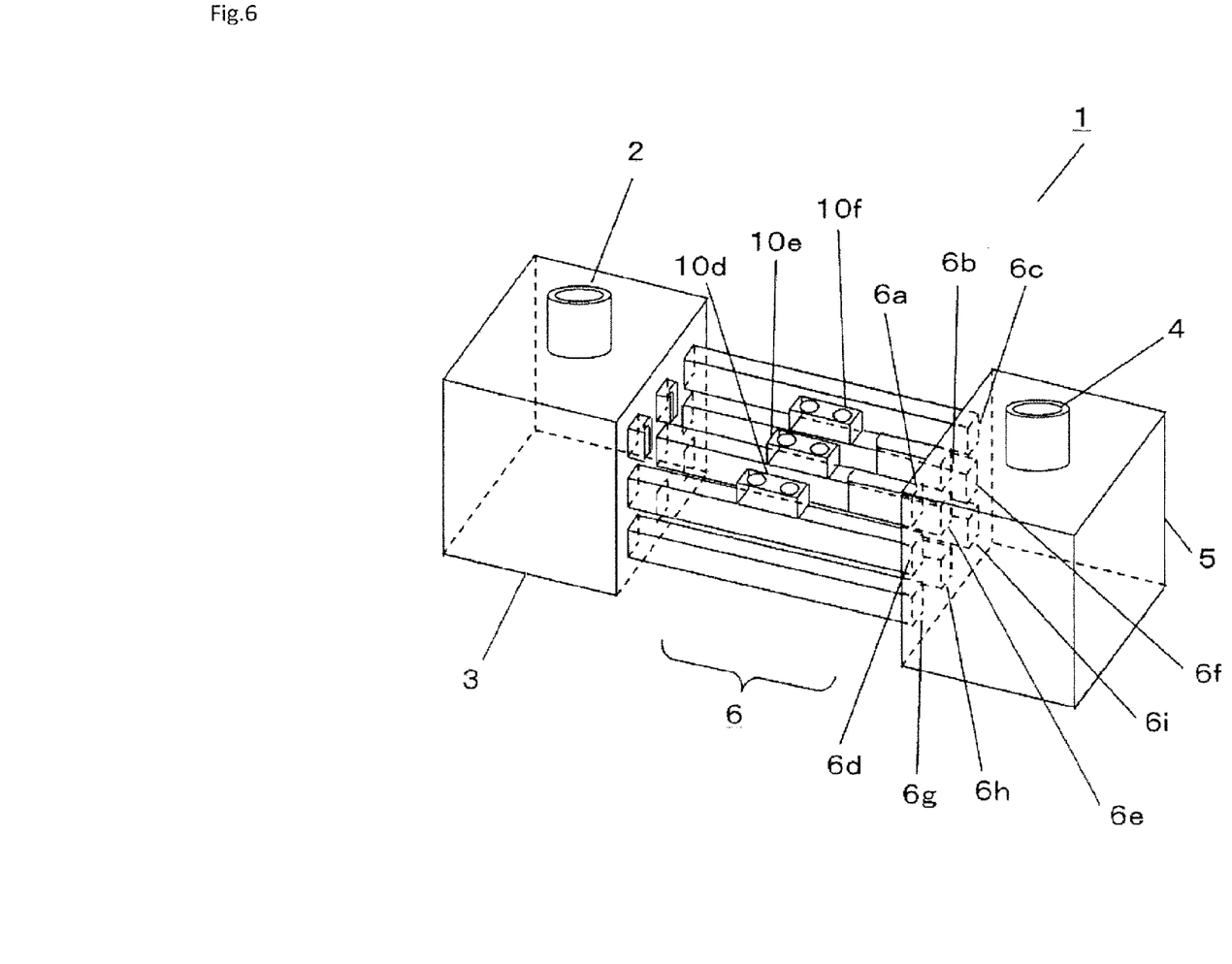
FIG. 6 is a perspective view showing a flow meter device according to Embodiment 2 of the present invention.

The above-described flow meter device 1 according to Embodiment 1 is configured such that one ultrasonic sensor unit 10 is installed on the measurement passage portion 6e. However, the number of ultrasonic sensor units 10 to be installed is not limited to one. For example, the flow meter device 1 according to Embodiment 2 is configured such that a plurality of ultrasonic sensor units 10 are installed on a plurality of measurement passage portions 6, respectively. FIG. 6 is a perspective view showing the flow meter device 1 according to Embodiment 2 of the present invention. It should be noted that, in FIG. 6, only part of the measurement passage portions 6a and 6b is represented by solid lines, and only part of the measurement passage portions 6h and 6i is represented by dashed lines so that the ultrasonic sensor units 10 can be readily seen.

As shown in FIG. 6, in the present embodiment, the plurality of ultrasonic sensor units 10 are three ultrasonic sensor units 10d, 10e, and 10f. The ultrasonic sensor unit 10d is installed on the measurement passage portion 6d. The ultrasonic sensor unit 10e is installed on the measurement passage portion 6e. The ultrasonic sensor unit 10f is installed on the measurement passage portion 6f. The ultrasonic transducers 11 and 12 (FIG. 4) of each of the ultrasonic sensor units 10d, 10e, and 10f are connected to the measurement circuit 20 (FIG. 4) by lead wires.

The flow meter device 1 with the above-described configuration measures the flow rate Qt in the piping 40 (FIG. 5) by using the three ultrasonic sensor units 10d, 10e, and 10f. In this case, by transmitting and receiving ultrasonic waves by means of the ultrasonic sensor units 10d, 10e, and 10f, the measurement circuit 20 (FIG. 4) calculates the propagation times t1 and t2 of the ultrasonic waves.

Then, based on the propagation times t1 and t2, the arithmetic operation circuit 21 (FIG. 4) calculates flow velocities Vd, Ve, and Vf in the respective measurement passage portions 6d, 6e, and 6f by using the above equation (3). Next, based on the flow velocities Vd, Ve, and Vf, the arithmetic operation circuit 21 calculates flow rates qd, qe, and qf in the respective measurement passage portions 6d, 6e, and 6f by using the above equation (4). The arithmetic operation circuit 21 calculates an average value qave of the flow rates qd, qe, and qf by using an equation (6) below.

$$qave=(qd+qe+qf)/3 \quad (6)$$

The arithmetic operation circuit 21 calculates the flow rate Qt in the piping 40 by using the average value qave in place of the flow rate qe in the above equation (5).

According to the embodiment described above, the flow rate Qt in the piping 40 is calculated based on the average value qave of the flow rates qd, qe, and qf in the plurality of measurement passage portions 6. The average value gave is a value that more precisely reflects the average value of the flow velocities in the respective measurement passage portions 6. Consequently, the precision of the measurement of the flow rate Qt by the flow meter device 1 is further improved.

Although in the above description the flow meter device 1 includes three ultrasonic sensor units 10, the number of ultrasonic sensor units 10 to be included in the flow meter device 1 is not limited to three, so long as the number of measurement passage portions 6 each provided with the ultrasonic sensor unit 10 is plural. Specifically, the number of measurement passage portions 6 needs to be at least three, and among the at least three measurement passage portions 6, at least two measurement passage portions 6 each need to be provided with the ultrasonic sensor unit 10 while there needs to be at least one measurement passage portion 6 that is not provided with the ultrasonic sensor unit 10. By using the plurality of ultrasonic sensor units 10 in the above-described manner, the number of ultrasonic sensor units 10 can be reduced while maintaining high measuring precision of the flow meter device 1.

Although in the above description the ultrasonic sensor units 10 are installed on the measurement passage portions 6d, 6e, and 6f, respectively, the installation positions of the ultrasonic sensor units 10 are not limited to these positions, so long as, for example, the average value of the flow rates in the plurality of measurement passage portions 6 on which the ultrasonic sensor units 10 are installed is the average value of the flow rates in the nine measurement passage portions 6 or a value close thereto. For example, the center of the layout of all the measurement passage portions 6 may be set as a reference point, and a pair of or pairs of measurement passage portions 6 arranged symmetrically with respect to the reference point may be each provided with the ultrasonic sensor unit 10. As one example, the measurement passage portion 6a and the measurement passage portion 6i may be each provided with the ultrasonic sensor unit 10.

Embodiment 3

Figure 7:
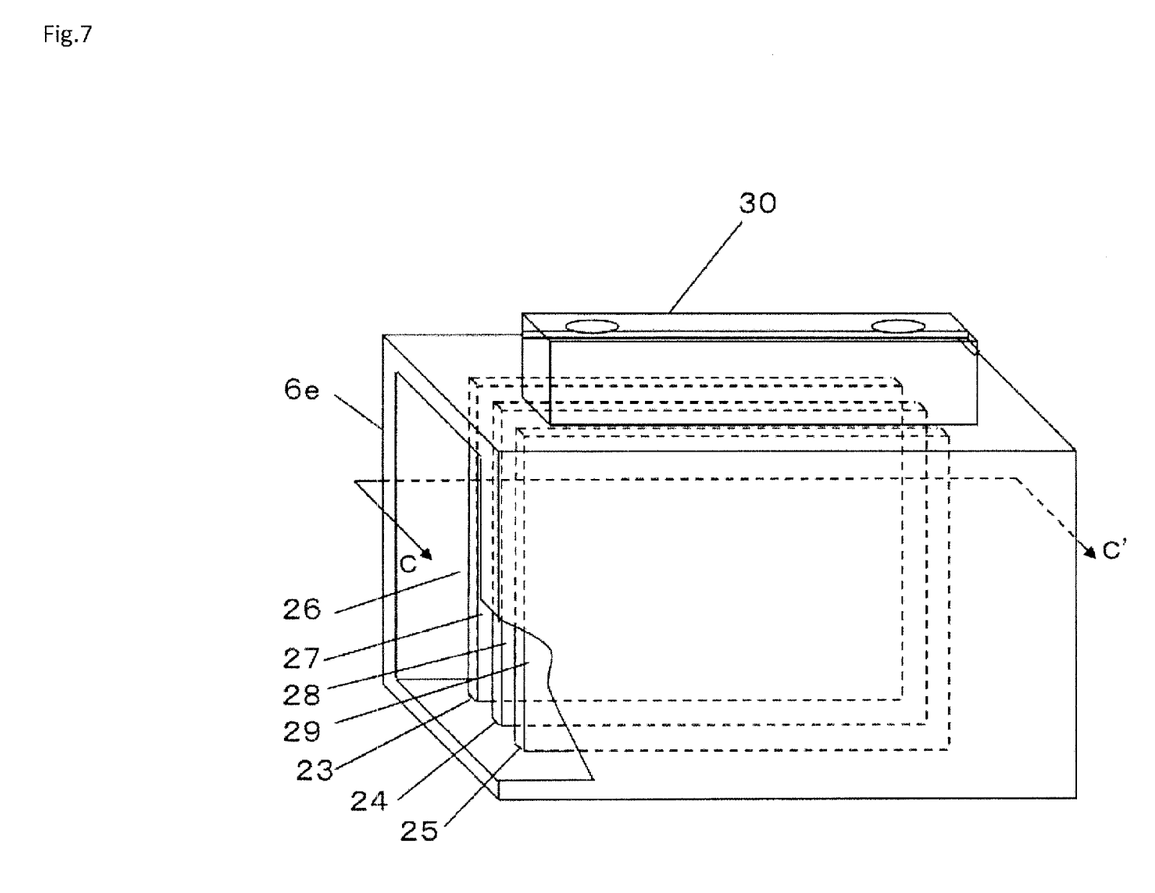
FIG. 7 is a perspective view showing part of a measurement passage portion of a flow meter device according to Embodiment 3 of the present invention.
Figure 8:
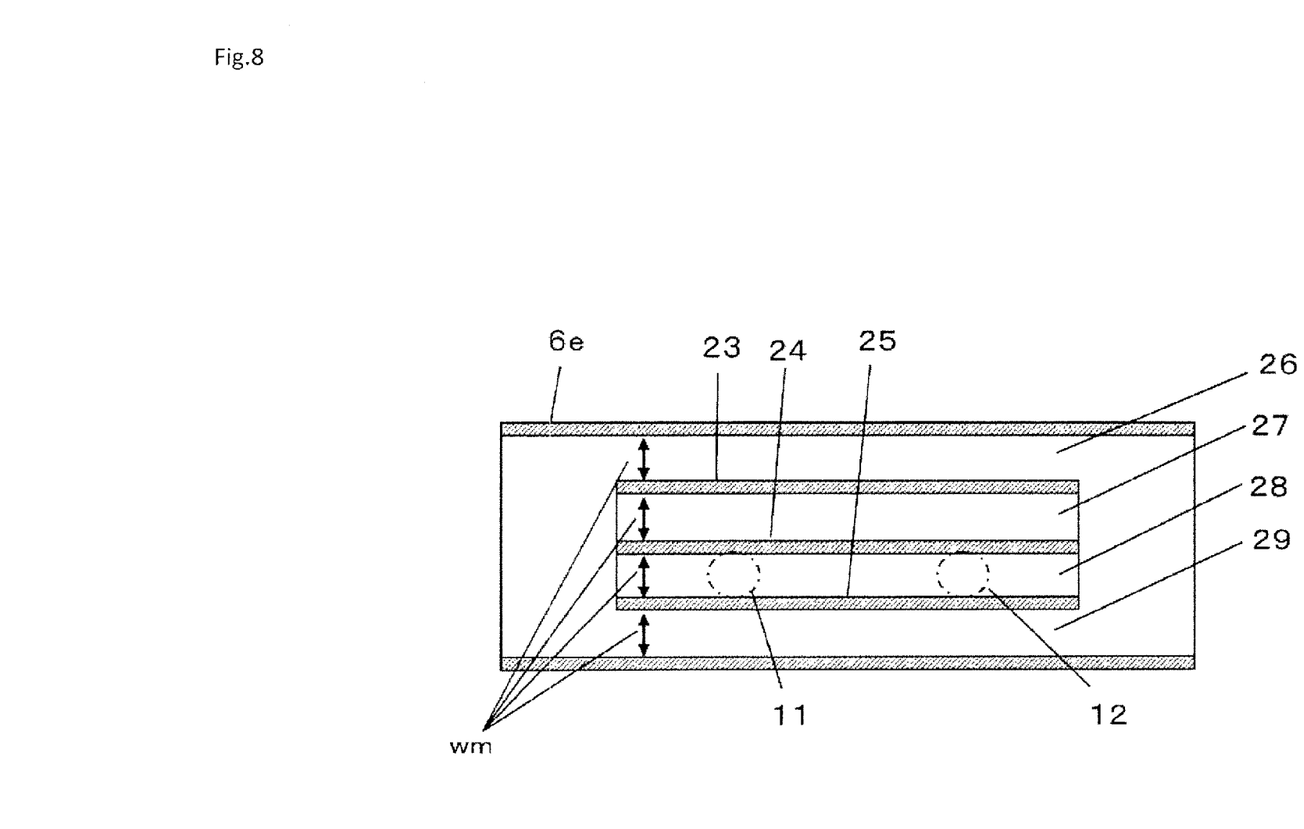
FIG. 8 is a sectional view showing the measurement passage portion, which is cut along line C-C' of FIG. 7.

In Embodiments 1 and 2 described above, each measurement passage portion 6 includes one measurement passage, whereas in Embodiment 3, the measurement passage is divided into a plurality of measurement passages. FIG. 7 is a perspective view showing part of the measurement passage portion 6e of the flow meter device 1 according to Embodiment 3. FIG. 8 is a sectional view showing the measurement passage portion 6e, which is cut along line C-C' of FIG. 7. As shown in FIG. 7 and FIG. 8, the measurement passage portion 6e includes a plurality of partition plates. In the present embodiment, the plurality of partition plates are a first partition plate 23, a second partition plate 24, and a third partition plate 25. Each of the partition plates 23, 24, and 25 is a rectangular flat plate. The height dimension of each of the partition plates 23, 24, and 25 is the same as the height dimension h (FIG. 2) of the measurement passage of the measurement passage portion 6c. The width dimension between adjoining plates of the partition plates 23, 24, and 25 is less than the width dimension w (FIG. 2) of the measurement passage of the measurement passage portion 6e. The length dimension of each of the partition plates 23, 24, and 25 is the same as or less than the length dimension m (FIG. 2) of the measurement passage portion 6e.

The three partition plates 23, 24, and 25 are arranged parallel to each other in the measurement passage, which is the interior space of the measurement passage portion 6e. The partition plates 23 to 25 are parallel to the side surfaces of the measurement passage portion 6, and are provided perpendicularly to the upper surface 15 and the lower surface 16 of the measurement passage portion 6.

The measurement passage is divided into four passages by the three partition plates 23, 24, and 25. The four passages are, for example, a first flattened passage 26, a second flattened passage 27, a third flattened passage 28, and a fourth flattened passage 29.

As shown in FIG. 8, the width dimensions wm of the respective flattened passages 26 to 29 are equal to each other. The width dimension WM is set such that the flow of the fluid in each of the flattened passages 26 to 29 becomes a streamline flow. The width dimension wm herein is set such that, even if the flow velocity in each of the flattened passages 26 to 29 is at its maximum, the flow of the fluid in each of the flattened passages 26 to 29 becomes a streamline flow.

An ultrasonic sensor unit 30 is disposed on the top of the third flattened passage 28. The ultrasonic sensor unit 30 is configured in the same manner as the ultrasonic sensor unit 10, and includes the body 10a, the first ultrasonic transducer 11, and the second ultrasonic transducer 12. The ultrasonic transducers 11 and 12 are provided on the third flattened passage 28.

The measurement passage portions other than the measurement passage portion 6e, i.e., the measurement passage portions 6a, 6b, 6c, 6d, 6f, 6g, 6h, and 6i, are not provided with the ultrasonic sensor unit 30. However, these measurement passage portions 6a to 6d and 6f to 6i are each provided with the partition plates 23 to 25 similar to the measurement passage portion 6e. Accordingly, the measurement passage of each of the measurement passage portions 6a to 6d and 6f to 6i is divided into the four flattened passages 26 to 29 by the partition plates 23 to 25.

The flow meter device 1 with the above-described configuration measures the flow rate Qt in the piping 40 (FIG. 5) by using the ultrasonic sensor unit 30 provided on the third flattened passage 28 of the measurement passage portion 6e. In this case, by transmitting and receiving ultrasonic waves by means of the ultrasonic sensor unit 30, the measurement circuit 20 (FIG. 4) calculates the propagation times t1 and t2 of the ultrasonic waves.

Then, based on the propagation times t1 and t2, the arithmetic operation circuit 21 (FIG. 4) calculates a flow velocity Ve3 in the third flattened passage 28 by using the above equation (3). Next, based on the flow velocity V3, the arithmetic operation circuit 21 calculates a flow rate qes in the third flattened passage 28 by using the above equation (4). Sine each of the nine measurement passage portions 6 includes the four flattened passages, the flow rate Qt in the piping 40 can be represented by an equation (7) below. Accordingly, the arithmetic operation circuit 21 calculates the flow rate Qt by using the equation (7) below. It should be noted that a correction coefficient Ks in the equation (7) is obtained in advance through an experiment or the like based on a relationship between the flow rate qe in the measurement passage of the measurement passage portion 6 and the flow rate qes in the third flattened passage 28.

$$Qt=9\times 4\times Ks\times qes \qquad (7)$$

According to the above-described embodiment, each measurement passage portion 6 is divided into the plurality of flattened passages 26 to 29 by the partition plates 23 to 25. Accordingly, the width dimension wm of each of the flattened passages 26 to 29 is small, which allows the flow in each of the flattened passages 26 to 29 to readily become a streamline flow. Consequently, the precision of the measurement of the flow rate Qt by the flow meter device 1 is further improved.

Owing to the partition plates 23 to 25, the width dimension of the passage for flowing the fluid is reduced from the width dimension w of the measurement passage of the measurement passage portion 6 to the width dimension wm of each of the flattened passages 26 to 29. Since the flattened passages 26 to 29 are thus thin, a boundary layer is formed in the streamline flow in each of the flattened passages 26 to 29. This results in an increase in resistance to the flow passing through each passage. Owing to the resistance, the fluid tends to uniformly flow into each passage. Consequently, the precision of the measurement of the flow rate Qt by the flow meter device 1 is further improved.

Although in the above description one ultrasonic sensor unit 30 is installed on the third flattened passage 28 of the measurement passage portion 6e, the number of ultrasonic sensor units 30 to be installed and the installation positions of the ultrasonic sensor units 30 are not thus limited. For example, a plurality of ultrasonic sensor units 30 may be provided on one or a plurality of flattened passages so that the average value of the flow rates in all the flattened passages, or a value close thereto, can be measured.

In the above description, the flow rate in one flattened passage 28 is measured by means of one ultrasonic sensor unit 30. However, as an alternative, the flow rates in a plurality of flattened passages may be measured at the same time by means of the ultrasonic sensor unit 30.

Although in the above description the partition plates 23 to 25 are provided parallel to the side surfaces of the measurement passage portion 6, the arrangement of the partition plates 23 to 25 is not thus limited. For example, the partition plates 23 to 25 may be provided perpendicularly to the side surfaces of the measurement passage portion 6 and parallel to the upper surface 15 and the lower surface 16 of the measurement passage portion 6.

Embodiment 4

Figure 9:
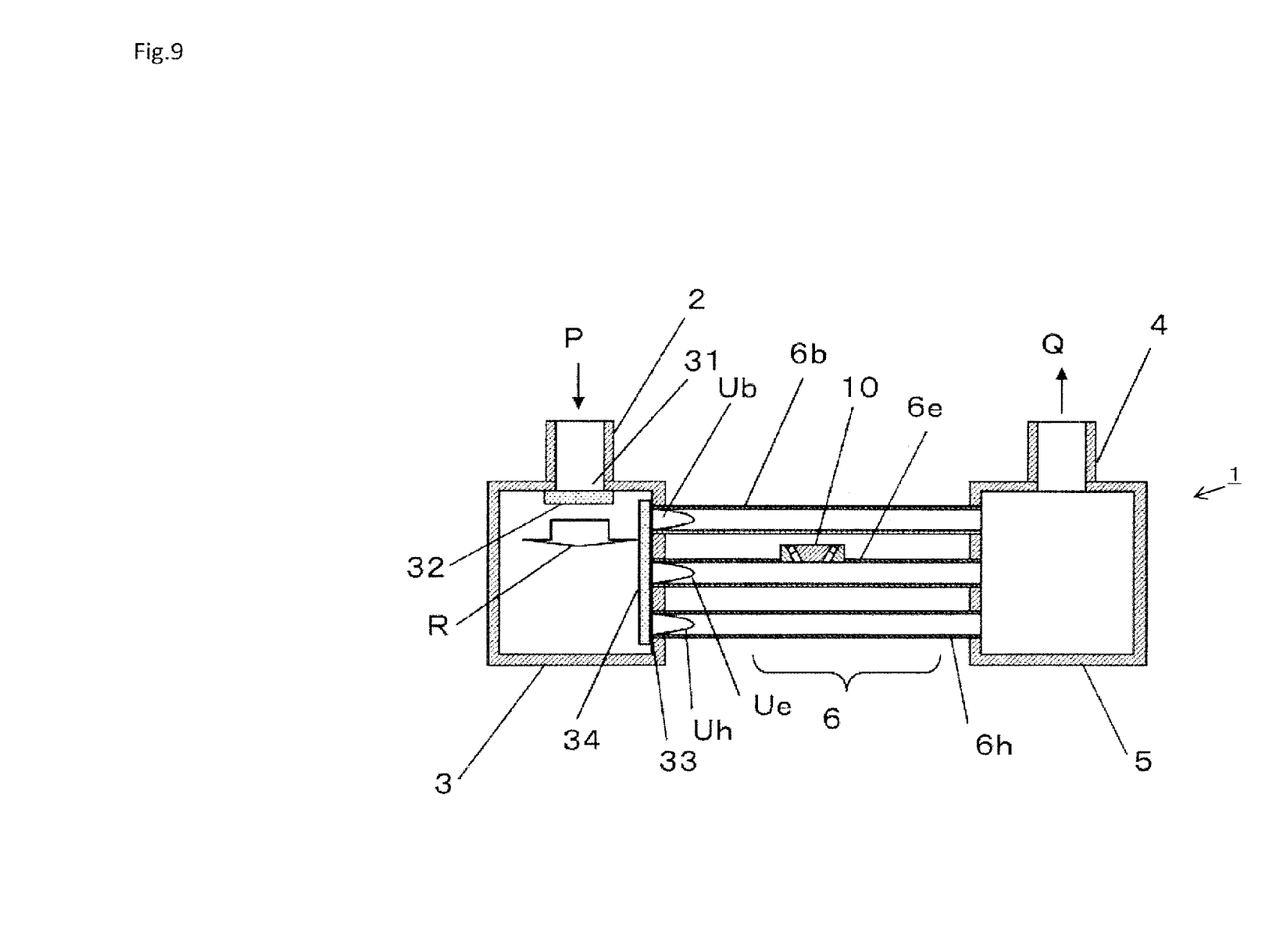
FIG. 9 is a sectional view showing a flow meter device according to Embodiment 4 of the present invention.

The flow meter device 1 according to Embodiment 4 further includes straightening members. FIG. 9 is a sectional view showing the flow meter device 1 according to Embodiment 4. As shown in FIG. 9, straightening members 32 and 34 are provided in the inlet portion 3.

The straightening member 32 is fixed to a connection 31 between the inlet portion 3 and the inlet pipe 2 such that, in the interior space of the inlet portion 3, the straightening member 32 covers the opening of the inlet pipe 2. The straightening member 32 allows the fluid to pass through such that the fluid flows from the inlet pipe 2 into the inlet portion 3 while causing a decrease in the flow velocity of the fluid. For example, a porous body with a large number of micropores formed therein is used as the straightening member 32.

The straightening member 34 is fixed to a connection 33 between the inlet portion 3 and the measurement passage portions 6 such that, in the interior space of the inlet portion 3, the straightening member 34 covers the openings of all the measurement passage portions 6a to 6i. The straightening member 34 allows the fluid to pass through such that the fluid flows from the inlet portion 3 into the measurement passage portions 6 while causing a decrease in the flow velocity of the fluid. For example, a porous body with a large number of micropores formed therein is used as the straightening member 34.

In the flow meter device 1 with the above-described configuration, the fluid flows from the inlet pipe 2 into the inlet portion 3. At the time, the fluid passes through the straightening member 32 at the connection 31. Therefore, the flow velocity of the fluid in a direction along the inlet pipe 2 as indicated by an arrow R in FIG. 9 is weakened.

The fluid spreads in the interior space of the inlet portion 3, and flows into the measurement passages of the respective measurement passage portions 6a to 6i. At the time, the straightening member 34 exerts resistance on the fluid at the connection 33. This causes the fluid to uniformly flow into each measurement passage. Then, the fluid passes through each measurement passage, and flows out of each measurement passage into the outlet pipe 4 through the outlet portion 5.

According to the above-described configuration, the straightening members 32 and 34 are provided in the inlet portion 3. Accordingly, the fluid flows into each measurement passage at a uniform flow rate. The average value of the flow rates in the respective measurement passages, or a value close thereto, can be measured by means of the ultrasonic sensor unit 10. Consequently, the precision of the flow rate measurement by the flow meter device 1 is further improved.

The above-described configuration includes the two straightening members 32 and 34. However, an alternative configuration may be adopted, which includes either one of the two straightening members 32 and 34.

In the above description, the straightening members 32 and 34 are provided in the inlet portion 3. However, as an alternative, the straightening members 32 and 34 may be provided in the outlet portion 5. In this case, the straightening member 32 is fixed to a connection between the outlet portion 5 and the outlet pipe 4 such that, in the interior space of the outlet portion 5, the straightening member 32 covers the opening of the outlet pipe 4. The straightening member 34 is fixed to a connection between the outlet portion 5 and the measurement passage portions 6 such that, in the interior space of the outlet portion 5, the straightening member 34 covers the openings of all the measurement passage portions 6a to 6i. Accordingly, pressure of the fluid flowing out of the measurement passage portions 6 into the outlet portion 5 (i.e., back pressure) occurs. The back pressure causes the flow rates of the fluid flowing into the respective measurement passages to be uniform.

Although in the above description the straightening members 32 and 34 are formed separately from the inlet portion 3, the straightening members 32 and 34 may be integrally formed on the inlet portion 3.

In the above description, the straightening member 32 is fixed to the connection 31, and the straightening member 34 is fixed to the connection 33. In this configuration, a gap may be formed between the straightening member 32 and the connection 31 and between the straightening member 34 and the connection 33.

Components that allow the fluid to pass through while causing a decrease in the flow velocity of the fluid are used as the straightening members 32 and 34 in the above description. However, the straightening members 32 and 34 are not limited to such members, but may be formed as, for example, plate-shaped members that are provided in the interior space of the inlet portion 3 and that guide the fluid from the inlet pipe 2 such that the fluid uniformly flows into each measurement passage.

The flow meter device 1 according to Embodiment 2 or 3 may also include the straightening members 32 and 34.

Any of the above-described embodiments may be combined with each other, so long as the combined embodiments do not contradict with each other.

From the foregoing description, numerous modifications and other embodiments of the present invention are obvious to one skilled in the art. Therefore, the foregoing description should be interpreted only as an example and is provided for the purpose of teaching the best mode for carrying out the present invention to one skilled in the art. The structural and/or functional details may be substantially altered without departing from the spirit of the present invention.

INDUSTRIAL APPLICABILITY

The flow meter device according to the present invention is useful as, for example, a flow meter device that realizes cost reduction while maintaining high measuring precision.

As described above, a plurality of passages having the same cross-sectional shape are used in the flow meter device according to the present invention, and an overall flow rate can be measured by measuring a flow rate in part of the passages. Therefore, the flow meter device according to the present invention is applicable to a wide range of applications that require the measurement of a large flow rate, for example, applicable to a professional-use large-sized gas meter.

What is claimed is:

1. A flow meter device comprising:
   an inlet portion, into which a fluid flows;
   an outlet portion, from which the fluid flows out;
   a plurality of measurement passage portions provided parallel to each other between the inlet portion and the outlet portion, each measurement passage portion being structured to form an enclosure and arranged at a regular interval from a neighboring measurement passage portion; and
   at least one flow rate measurement unit, each flow rate measurement unit being configured to measure a flow rate of the fluid that flows through a passage in a corresponding one of the measurement passage portions, wherein
   shapes of passages in the respective measurement passage portions coincide with each other, and
   the plurality of measurement passage portions include:
      the one measurement passage portion(s), which is/are each provided with the flow rate measurement unit; and
      the other measurement passage portion(s), which is/are not provided with the flow rate measurement unit.

2. The flow meter device according to claim 1, wherein a dimension of a cross section of the passage of each measurement passage portion, the cross section being obtained by cutting the passage perpendicularly to a longitudinal direction of the measurement passage portion, is set such that when a flow of the fluid is at a maximum flow velocity, the flow becomes a streamline flow.

3. The flow meter device according to claim 1, wherein:
   the plurality of measurement passage portions comprise at least three measurement passage portions;
   at least two of the plurality of measurement passage portions are each provided with the flow rate measurement unit; and
   at least one of the plurality of measurement passage portions is not provided with the flow rate measurement unit.

4. The flow meter device according to claim 1, further comprising partition plates, each partition plate dividing the passage of a corresponding one of the measurement passage portions in parallel to a longitudinal direction of the corresponding measurement passage portion.

5. The flow meter device according to claim 1, further comprising a straightening member provided in at least one of an interior space of the inlet portion and an interior space of the outlet portion.

* * * * *